US00RE35140E

United States Patent [19]

Powers, Jr.

[11] E Patent Number: Re. 35,140

[45] Reissued Date of Patent: Jan. 9, 1996

[54] BLOW MOLDED BOTTLE WITH IMPROVED SELF SUPPORTING BASE

[75] Inventor: Thomas F. Powers, Jr., St. Francisville, La.

[73] Assignee: Hoover Universal, Inc., Plymouth, Mich.

[21] Appl. No.: 761,405

[22] Filed: Sep. 17, 1991

Related U.S. Patent Documents

Reissue of:

[64] Patent No.: 4,867,323
Issued: Sep. 19, 1989
Appl. No.: 219,732
Filed: Jul. 15, 1988

[51] Int. Cl.[6] ..... B65D 1/02

[52] U.S. Cl. ..... 215/375; 220/606

[58] Field of Search ..... 215/1 C, 375; 220/606, 608

[56] References Cited

U.S. PATENT DOCUMENTS

| | | | |
|---|---|---|---|
| 3,403,804 | 10/1968 | Colombo | 215/1 C X |
| 3,598,270 | 8/1971 | Adomaitis | 215/1 C |
| 3,722,726 | 3/1973 | Carmichael et al. | 215/1 C |
| 3,727,783 | 4/1973 | Carmichael | 215/1 C |
| 3,759,410 | 9/1973 | Uhlig | 215/1 C |
| 3,935,955 | 2/1976 | Das | 215/1 C |
| 3,973,693 | 8/1976 | Brocklehurst | 220/606 X |
| 4,108,324 | 8/1978 | Krishnakumar et al. | 215/1 C |
| 4,134,510 | 1/1979 | Chang | 215/1 C |
| 4,249,666 | 2/1981 | Hubert et al. | 215/1 C |
| 4,249,667 | 2/1981 | Pocock et al. | 215/1 C |
| 4,254,882 | 3/1981 | Yoshino | 215/1 C |
| 4,261,948 | 4/1981 | Krishnakumar et al. | 215/1 C X |
| 4,294,366 | 10/1981 | Chang | 215/1 C |
| 4,318,489 | 3/1982 | Snyder et al. | 215/1 C |
| 4,334,627 | 6/1982 | Krishnakumar et al. | 215/1 C |
| 4,352,435 | 10/1982 | Yoshino et al. | 215/1 C |
| 4,403,706 | 9/1983 | Mahajan | 220/606 X |
| 4,465,199 | 8/1984 | Aoki | 215/1 C |
| 4,598,831 | 7/1986 | Nakamura et al. | 215/1 C |
| 4,620,639 | 11/1986 | Yoshino | 215/1 C |
| 4,755,404 | 7/1988 | Collette | 215/1 C X |

FOREIGN PATENT DOCUMENTS

| | | | |
|---|---|---|---|
| 225155 | 6/1987 | European Pat. Off. | 215/1 C |
| 2067160 | 7/1981 | United Kingdom | 215/1 C |
| 8605462 | 9/1986 | WIPO | 220/606 |
| 8704974 | 8/1987 | WIPO | 215/1 C |

*Primary Examiner*—Sue A. Weaver
*Attorney, Agent, or Firm*—Harness, Dickey & Pierce

[57] ABSTRACT

An improved beverage bottle support base is disclosed having an upwardly directed conical inner wall, the apex of which is centrally of the base and a convex outer wall of annular shape surrounding the conical inner wall and merging therewith and with the side wall of the bottle. A plurality of reinforcing grooves extend radially outward from the apex and merging with the convex outer wall, dividing the conical inner wall and convex outer wall into a plurality of spaced apart hollow feet.

11 Claims, 3 Drawing Sheets

BLOW MOLDED BOTTLE WITH IMPROVED SELF SUPPORTING BASE

Matter enclosed in heavy brackets [ ] appears in the original patent but forms no part of this reissue specification; matter printed in italics indicates the additions made by reissue.

BACKGROUND OF THE INVENTION

This invention relates in general to plastic bottles for beverages and more particularly to an improved self supporting base for such bottles which provides increased strength to resist bottom roll out due to internal carbonation pressures.

A major difficulty with the use of plastic beverage bottles for carbonated beverages is the strength of the bottom of the bottle. Due to internal carbonation pressures which can be as high as 100 psi, plastic bottles have a tendency to bulge outward at the bottom creating what is referred to as a "rocker" which will rock back and forth when standing and/or possibly tip over. In addition, as the bottom of the bottle bulges out, the volume of the bottle increases, thereby lowering the fill line such that customers are led to believe the bottle is not properly filled or sealed.

One solution is to provide a bottle having a hemispherical bottom and attach a second plastic piece which comprises a support stand for the bottle. This solution however, adds considerably to the weight and cost of the bottle. Several bottles have been developed which include a self supporting base molded into the bottle. One way to manufacture a self supporting bottle which resists rollout is to increase the amount of plastic material in the base. The amount of material necessary to provide sufficient strength, however, results in a prohibitedly expensive bottle.

Other bottles have been developed which incorporate a number of features into the bottom to prevent roll out. One such bottle is illustrated in U.S. Pat. No. 3,727,783 which includes, among other features, an axially aligned re-entrant cylinder about the center of the bottle base. This re-entrant however, is difficult to blow mold in small bottles with a volume of one liter or less.

Another bottle is illustrated in U.S. Pat. No. 3,598,270 which illustrates what is known as a petaloid design. The petaloid design is also difficult to use for small volume bottles under one liter because the petaloid feet are cumbersome to blow into such small diameter bottles. The petaloid design also requires more material, adding excessive weight to the bottle. Additionally, the diameter of the contact points is relatively small, limiting the stability of the bottle.

Another bottle design is illustrated in U.S. Pat. No. 4,261,948 which has become known as the "supa" bottle. The "supa" bottle is similar in design to a champagne bottle having an inward depression or cone at the bottom of the bottle. The "supa" bottle includes a number of radially outward reinforcing ribs molded into the inner surface of the cone, thereby increasing its strength and eliminating roll out of the cone section. These ribs we formed by molding longitudinal ribs into the end cap area of the injection molded preform. During the blow molding process, these ribs act to reduce the amount of material stretching in the bottle base. As a result of reduced stretching, the wall thickness of the base is greater than in bottles without the reinforcing ribs. The "supa" bottle is more difficult to blow mold because the stretch of the ribbing must be precisely controlled. Additionally, with the "supa" bottles, the wall thickness of the contact area is difficult to control. Contact areas with thinner walls will creep more when the bottle is pressurized than areas with thicker walls, this results in a bottle which will not stand perpendicularly.

Accordingly, it is an object of this invention to provide a small volume plastic bottle in which the process parameters are less restrictive than with the "supa" bottle.

It is another object of this invention to reduce the weight of the bottle and distribute the thermoplastic material in a more equitable manner throughout the bottle, A further object of this invention is to provide a bottle having improved perpendicularity.

A still further object of the invention is to provide a bottle having improved stability.

It is an advantage of this invention that the bottle weight can be reduced resulting in a cost savings or the material used.

It is a further advantage that the more evenly distributed material will increase the stability of the bottle and the shelf tire or the carbonated product within the bottle.

SUMMARY OF THE INVENTION

This invention provides a blow molded bottle with a unique base structure which is more efficient to process and uses less material than prior art bottles thereby reducing the weight and the cost of the bottle. The bottle according to this invention includes at its lower end a support base having an upward projecting conical inner wall, the apex of which is centrally of the base and a convex outer wall of annular shape surrounding the conical inner wall and merged with the inner wall [at a] *by an intermediate wall in the form of a* circular arc [forming] *including* a bearing surface at the lower most point of the bottle. The convex outer wall also merges with the lower end of the bottle side wall.

The juncture between the [circular arc] *intermediate wall* and the conical inner wall forms a sharp, inwardly directed, corner which provides added strength to the bearing surface of the bottle. Extending radially outward from the apex of the conical inner wall are three ribs which also merge into the convex outer wall. These ribs divide the concave inner wall and convex outer wall into three spaced apart hollow feet and provide additional strength to the base section.

Further objects, features and advantages of the invention will become apparent from a consideration of the following description and the appended claims when taken in connection with the accompanying drawings.

DETAILED DESCRIPTION OF THE DRAWINGS

Figure 1:
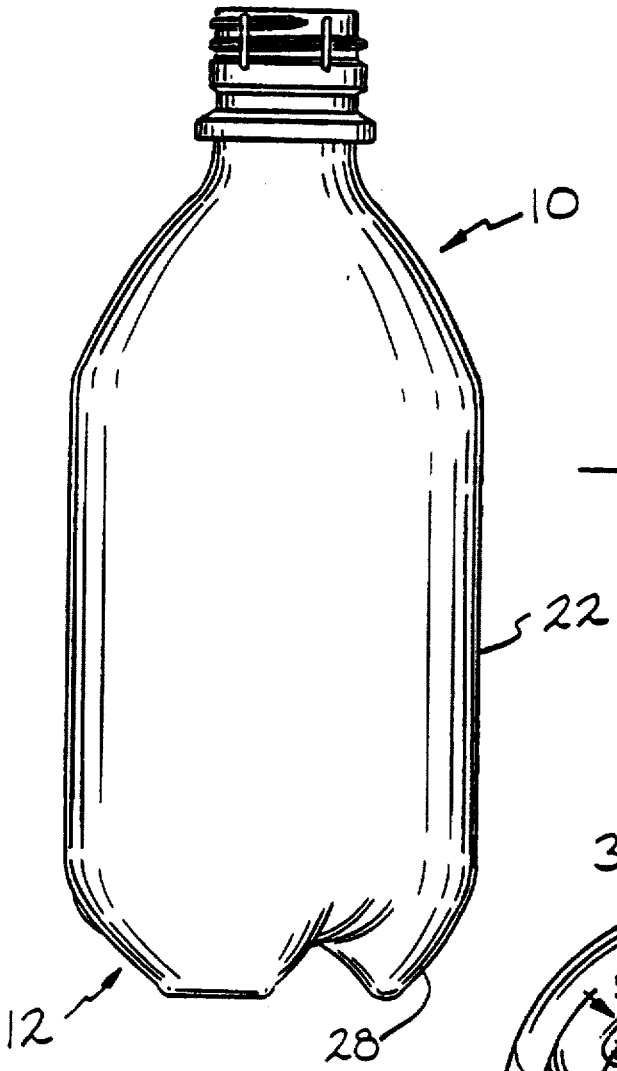
FIG. 1 is an elevation view of a beverage bottle having a support base of this invention.
Figure 2:
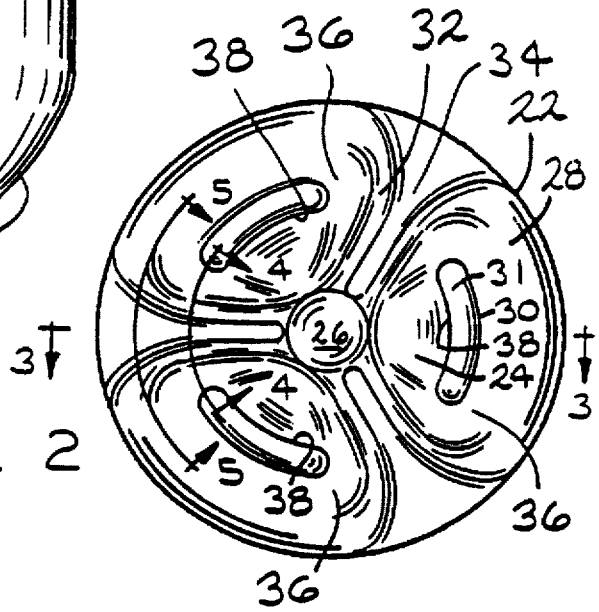
FIG. 2 is a bottom view of the beverage bottle in FIG. 1 showing the details of the support base.
Figure 3:
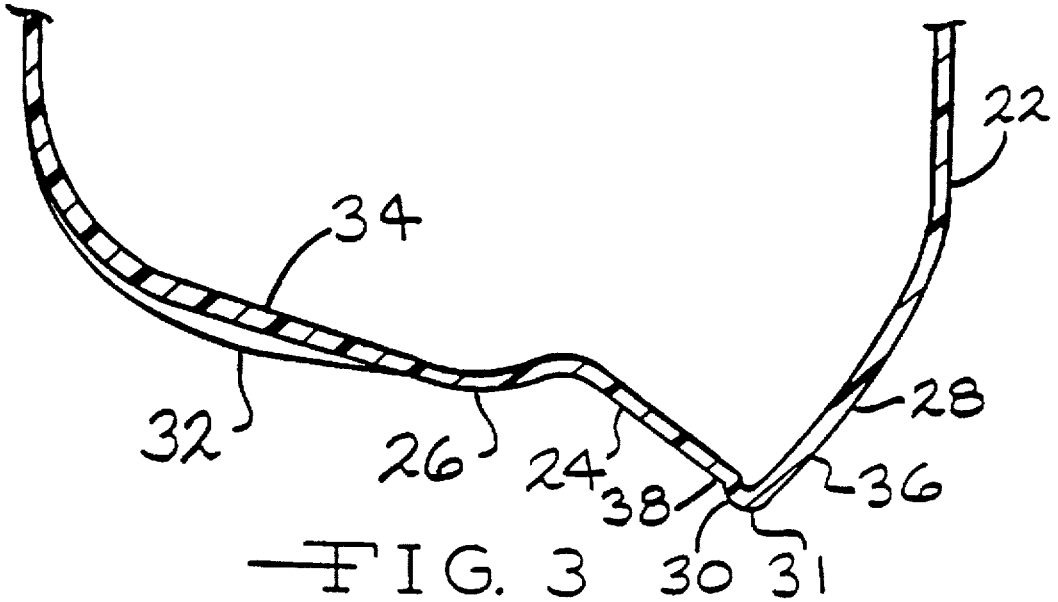
FIG. 3 is an enlarged sectional view of the support base as seen substantially along line 3—3 of FIG. 2.

Referring now to the drawings, FIG. 1 illustrates a bottle 10 having the improved support base 13 of this invention. The bottle includes a generally cylindrical side wall 22 having the support bus 13 at the lower end thereof.

The construction details of the base 12 are more readily seen in FIGS. 2 through 5. The support base includes an upwardly projecting conical inner wall portion 24 having the apex thereof at the center of the support base 12 and a convex outer wall 28 of annular shape surrounding the inner well 24 merged therewith at the lower most part of the bottle and also merged with the lower end of the cylindrical side wall 22. The apex 26 of conical inner wall 24 is shown as being convex. Apex 26 can be of any shape desired, for example, concave or horizontal.

The ribs 32 are described as "convex" because when the base 12 is viewed from below, looking upward, (FIG. 2) the lengthwise extending surfaces of the ribs 32 are convex (FIG. 3) in contrast to being horizontal or concave.

Extending radially outward from apex 26 are three convex ribs 32 which merle with convex outer wall 28, These convex ribs divide the conical Inner wall 24 and convex outer wall 28 extending below apex 26 into three spaced apart hollow feet 36 extending below apex 26. Ribs 32 provide strength to the support base to prevent the conical inner wall 24 from rolling out as s result of internal carbonation pressures. Any number of convex ribs 32 can be molded into the support base. Three is the preferred number as the bottle will stand without rocking or uneven surfaces. It may be difficult, however, to blow mold a small bottle with more than three convex ribs.

At the merger between conical inner wall 24 and convex outer wall 28 is *an intermediate wall 30 in the form of* a circular arc [30] which [defines] *includes* a bearing surface 31 at the lower most point of a bottle. Conical inner wall 24 and [bearing surface 31] *intermediate wall 30* are relatively inclined so as to form an inwardly directed corner 38 at the joint between the conical inner wall 24 and the *bearing surface 31 intermediate wall 30.* This corner 38 stiffens and increases the strength of the [bearing surface 31] *intermediate wall 30.*

Figure 4:
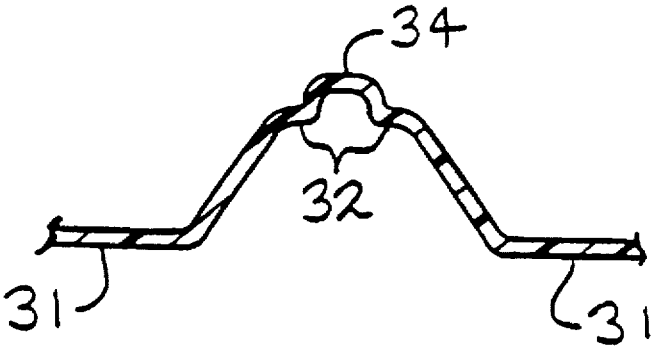
FIG. 4 is an enlarged sectional view of the support base as seen substantially along line 4—4 of FIG. 2.
Figure 5:
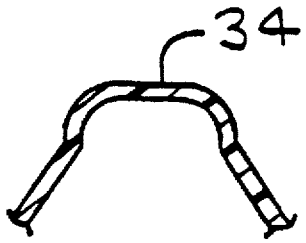
FIG. 5 is an enlarged sectional view of the support base as seen substantially along line 5—5 of FIG. 2.

To further increase the strength of the bottle support base, an upward projection or U-shaped rib 34 is molded in the center of each convex rib 32. Rib 34 extends from apex 26 radially outward until it merges with convex outer wall 28. Rib 34 increases in width as it extends radially outward. FIGS. 4 and 5 illustrate the shape of ribs 32 and 34 radially outward from apex 26.

As a result of the convex ribs 32 separating the feet 36, the bearing support surfaces 31 are circumferentially spaced apart from one another. This spacing can be varied by changing the width of the convex ribs 32. As shown, the bearing support surfaces 31 are widely circumferentially shaped with the circumferential space between bearings surfaces 31 approximately equal to the circumferential length of each surface 31.

The convex ribbed structure allows the feet 36 to be radially spaced further out than previous bottles such as the petaloid bottles. Radially spacing the feet provides a bottle having greater stability then petaloid bottles.

Because the feet 36 are spaced apart, wall thickness of the feet is easier to control When pressurized, the creep in the base is more even, thus producing a bottle with improved perpendicularly.

Figure 6:
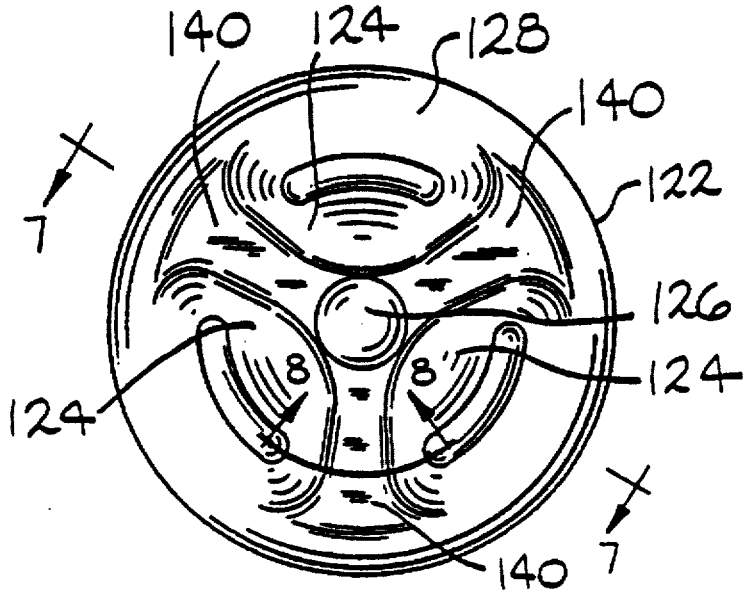
FIG. 6 is a bottom view of another embodiment of the support base of this invention.
Figure 7:
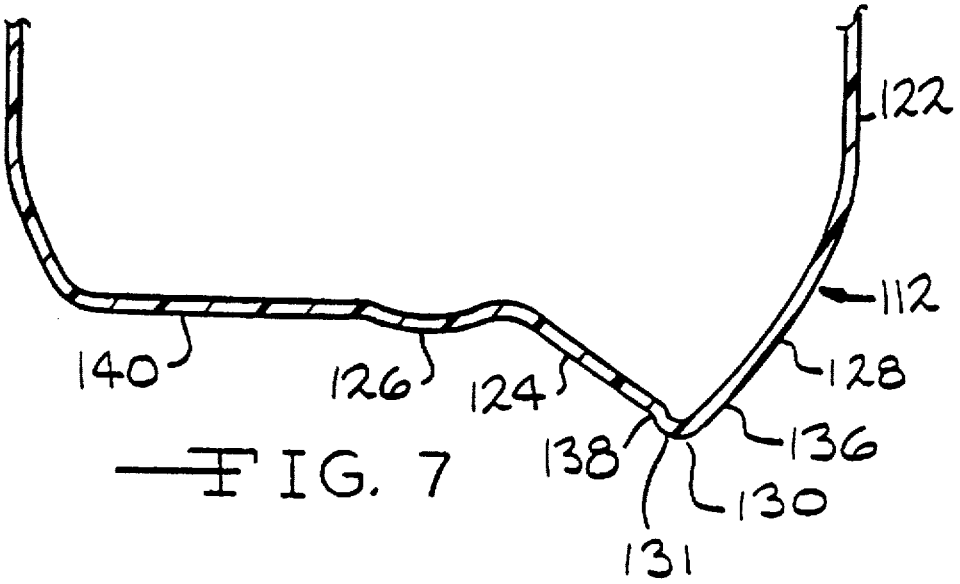
FIG. 7 is an enlarged sectional view of the support base as seen substantially along line 7—7 of FIG. 6, FIG. 8 Is an enlarged sectional view of the support base as seen substantially along line 8—8 of FIG. 6.
Figure 8:
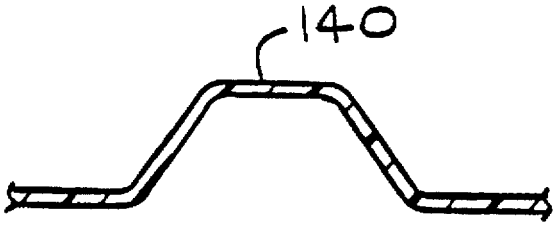

An alternative embodiment is shown in FIGS. 6 through 8. In the embodiment, the structure of the ribs which divide the conical inner wall and convex outer wall into the spaced apart feel has been modified from the previous embodiment. This bottle includes a cylindrical side wall 122 having a support base 112 extending from the lower end thereof. The support base 112 includes an upwardly directed conical inner wall 124 having an apex 126 at the center of the support base. This apex can be of any shape desired, not necessarily the convex shape as shown. A convex outer will 128 of annular shape surrounds the inner wall 124 and merges therewith at the lower most part of the bottle and with the lower edge of the cylindrical side wall 122. As with the previous embodiment, *an intermediate wall 130 in the form of* a circular arc [130] is molded at the merger of inner wall 124 with outer wall 128 defining a bearing surface 131. A corner 138 is formed between the [arc] *intermediate wall* 130 and conical inner wall 124. In this design, the convex ribs have been replaced with three generally horizontal fibs 140 extending radially outward from apex 126 and merging with the convex outer wall 128. Ribs 140 divide the inner wall 124 and outer wall 128 into three spaced apart feet 136. Ribs 140 also wrap partially around outer side of feet 136. The merger of ribs 140 with outer wall 128 is with a small radius curve which increases the strength of base 112.

In other words, the flat horizontal ribs 140 blend sharply with the convex outer wall 128 so as to reinforce the base 112 against undesirable deformation.

The preferred material for these bottles is polyethylene terepthalate (PET), however, a wide range of thermoplastic can be used such as high performance polyesters, PVC, nylon, and polyproplene. The bottles are molded using a conventional two step pre-heat stretch blow molding process, This is preferred over a one-step process because the one-step process provides less than optimum stretch ratios resulting in a bottle less suitable for applications with carbonated beverages.

During blow molding, the preform plastic tint contacts the apex and rib structure and then stretches into the feet and bearing surfaces. As a result of contacting the apex and ribs first, the plastic cools in this area first, reducing stretching in this area. The effect of this cooling is a greater wall thickness in the apex and ribs, producing greater strength to resist roll out. The stretch of the plastic from the apex to the bearing surfaces enables the plastic to be blow molded Into the small circular arcs at the bearing surfaces.

The support base construction can be varied primarily by slight changes to the curvature of the feet, the convex outer wall and the conical inner wall. The wrap around of the horizontal ribs around each foot may be extended to increase the support in the foot area. The wrapping feature, along with the sharp blend of the horizontal ribs with the convex outer wall, creates a ribbing effect that increases the strength of the bottle to resist roll out due to carbonation pressures.

It is to be understood that the invention is not limited to the exact construction illustrated and described above, but that various changes and modifications may be made without departing from the spirit and scope of the invention as defined in the following claims.

What is claimed:

1. A plastic bottle for beverages having a hollow body with a generally cylindrical side wall and a base structure merging with aid side wall, said base structure comprising: an upwardly concave inner wall having upper and lower ends and an apex at the upper end, said apex being substantially centrally of said base structure; a convex outer wall of annular shape surrounding said inner wall and having upper and lower ends, said outer wall merging with the lower end of said inner wall at the lower end of the outer wall and merging with the lower end of said side wall at the upper end of said outer wall;

a plurality of upwardly projecting ribs in said base structure extending radially outwardly from said apex to said outer wall, each of said ribs being smoothly continuous over substantially the entire length thereof, said ribs interrupting said base structure inner and outer walls so as to divide said inner wall and said outer wall into a plurality of circumferentially spaced apart hollow feet located below said ribs, said ribs merging with said outer wall at the radially outer ends of the ribs; and said feet forming beating surfaces at the lowermost points thereof for contact with a supporting surface, said bearing surfaces and said concave inner wall being relatively inclined when viewed in vertical section through said hollow feet so as to form corners directed interiorly of said bottle to stiffen said feet and resist deformation of said base structure.

2. The bottle of claim 1 wherein said ribs increase in width in a direction radially outwardly of said base structure.

3. The bottle of claim 1 wherein said plurality of ribs are three in number.

4. The bottle of claim 1 further comprising hollow stiffening projections formed on and projecting upwardly from said ribs.

5. The bottle of claim 4 wherein said upward projections are of substantially inverted U-shape.

6. The bottle of claim 4 wherein said upward projections are of progressively increasing width in a direction radially outwardly of said base structure.

7. The bottle of claim 1 wherein said bearing surfaces are formed by circular arc portions at the merger of said convex outer wail and said inner wall as viewed in vertical section through said hollow feet.

8. A plastic bottle for beverages having a hollow body with a generally cylindrical side wail and a base structure merging with said side wall, said base structure comprising:

an upwardly conical inner wall having upper and lower ends and an apex at the upper end, said apex being substantially centrally or said base structure;

a convex outer wall of annular shape surrounding said conical inner wall and having upper and lower ends, said outer wall merging with the lower end of said inner wall st the lower end of the outer wall and merging with the lower end of said side wall at the upper end of said outer wall;

an annular circular arc portion merging said conical inner wall with said convex outer wall defining a bearing surface, said conical inner wall and said circular arc portion being relatively inclined when viewed in vertical section through said bottle so as to form corners directed interiorly of said bottle adjacent the juncture of said inner wall and said circular arc portions to stiffen said [feet] *inner wall* and said arc portions;

three ribs upwardly projecting in said base structure extending radially outward from said apex, said ribs interrupting said base structure inner and outer walls so as to divide said conical inner wall and said convex outer wail into a plurality of spaced apart hollow feet located below said ribs, said ribs merging with said outer wall at the radially outer ends of the ribs; and hollow projections extending upward from said ribs, said upward projections increasing in width in a direction radially outwardly or said ribs from said apex.

*9. A plastic bottle having a hollow body with a generally cylindrical side wall and a base structure merging with said side wall, said base structure comprising:*

*an upwardly concave inner wall having a centrally located apex and extending downwardly and radially outwardly from said apex to an annular lower end;*

*a convex outer wall of annular shape surrounding said inner wall, said outer wall having an upper end merging with said side wall and extending downwardly and inwardly to an annular lower end;* an intermediate wall connecting the lower end of said inner wall with the lower end of said outer wall and including a bearing surface at the lower most point of said base structure for contact with a supporting surface, said intermediate wall and said concave inner wall being inclined relative to each other *at said bearing surface and* adjacent said lower end of said inner wall, when viewed in vertical section, so as to form a corner directed interiorly of said bottle *directly above said bearing surface* to stiffen and resist deformation of said base structure; and

*a plurality of radially outwardly extending ribs in said base structure, said ribs projecting upwardly and interrupting said intermediate wall and at least a portion of said outer wall so as to form in said base structure a plurality of circumferentially spaced apart hollow feet located below said ribs, said ribs being smoothly continuous over substantially the entire lengths thereof and merging with said outer wall at the radially outer ends of said ribs.*

*10. The bottle of claim 9 wherein said intermediate wall is a circular arc when viewed in vertical cross section.*

*11. The bottle of claim 9 wherein said ribs extend radially inwardly into said inner wall interrupting at least a portion of said inner wall.*

* * * * *